Oct. 9, 1962 W. J. RIDDLE ETAL 3,057,397
BELT TYPE PLY APPLICATOR
Filed June 16, 1960 2 Sheets-Sheet 2

INVENTORS
WILLIAM J. RIDDLE
BY CLAUDE MULLENDER
W. A. Shira Jr.
ATTY.

United States Patent Office 3,057,397
Patented Oct. 9, 1962

3,057,397
BELT TYPE PLY APPLICATOR
William J. Riddle, Cuyahoga Falls, and Claude Mullender, Barberton, Ohio, assignors to The B. F. Goodrich Company, New York, N.Y., a corporation of New York
Filed June 16, 1960, Ser. No. 36,545
7 Claims. (Cl. 156—405)

This invention pertains to apparatus for applying material in sheet or web form to an annular building drum, and, more particularly, to an apparatus for applying large individual sheets of cord reinforced elastomeric material to a rotatable tire building drum.

In the production of vehicle tires, particularly those types which are made of the center ply lap construction, in which opposite side portions of the sheets of reinforcing fabric are folded inward so that opposing edges of said sheets lap one upon the other, the application of the necessarily long and wide sheets of carcass reinforcing ply stock presents problems of handling and proper alignment. In the past it has been customary for the tire builder to keep the ply stock in manual alignment as the ply stock was wrapped about the drum and to manually splice the trailing edge of the ply stock.

Attempts have been made heretofore to provide apparatus whereby the tire building machine operator may be relieved of the responsibility for manually maintaining running alignment of the ply stock while it is being wrapped about the building drum. Such apparatus, however, have fallen short of their intended goal. Generally, in the use of such apparatus, unless the stock was subjected to some manual handling during the wrapping operation, the stock became badly wrinkled and misaligned. Moreover, the operator was still required to effect a manual splice of the trailing edge of the stock. This manual handling was particularly deleterious in the case of the application of weftless cord fabric material where cord angle and cord spacing are easily disordered.

The principal object of this invention is, therefore, the provision of an improved apparatus for applying large sheets of ply stock to a tire building drum which eliminates or greatly reduces the aforementioned difficulties.

Another object of the invention is to provide an improved apparatus of the type described having a flexible, continuous belt, arranged to receive the ply stock and move the leading edge of said stock into engagement with the peripheral surface of said drum with the stock and belt being moved in the direction of their length by frictional engagement with said drum.

Another object of the invention is to provide an apparatus as described in the preceding paragraph wherein guide means are provided to facilitate prealignment of the ply stock prior to engagement with the tire building drum.

A further object of the invention is to provide an apparatus as defined in the preceding paragraph wherein means are provided to move said belt around and into partial arcuate peripheral engagement with said drum, while maintaining tension on the belt while it is so moving.

Further objects and advantages of the invention will be apparent from the description of the presently preferred embodiment illustrated in the accompanying drawings, forming a part of this application, in which:

FIG. 3 is an enlarged, fragmentary view, partly in section and partly in elevation, showing the placement of the belt alignment rib in the annular groove of one of the running rolls.

Figure 1:
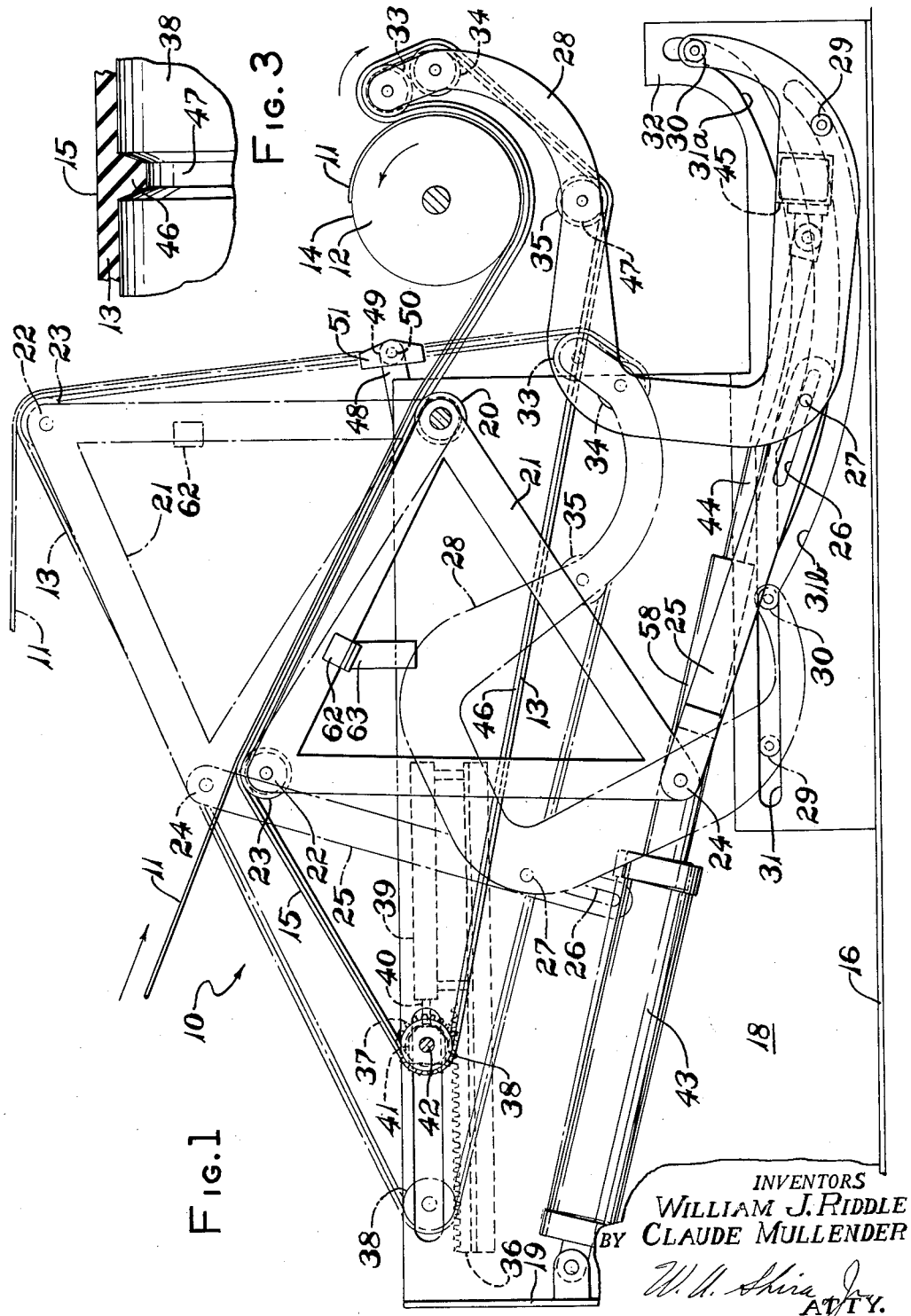
FIG. 1 is a side elevational view of the apparatus with portions partly broken away to facilitate illustration of the operative relationship of certain parts.
Figure 2:
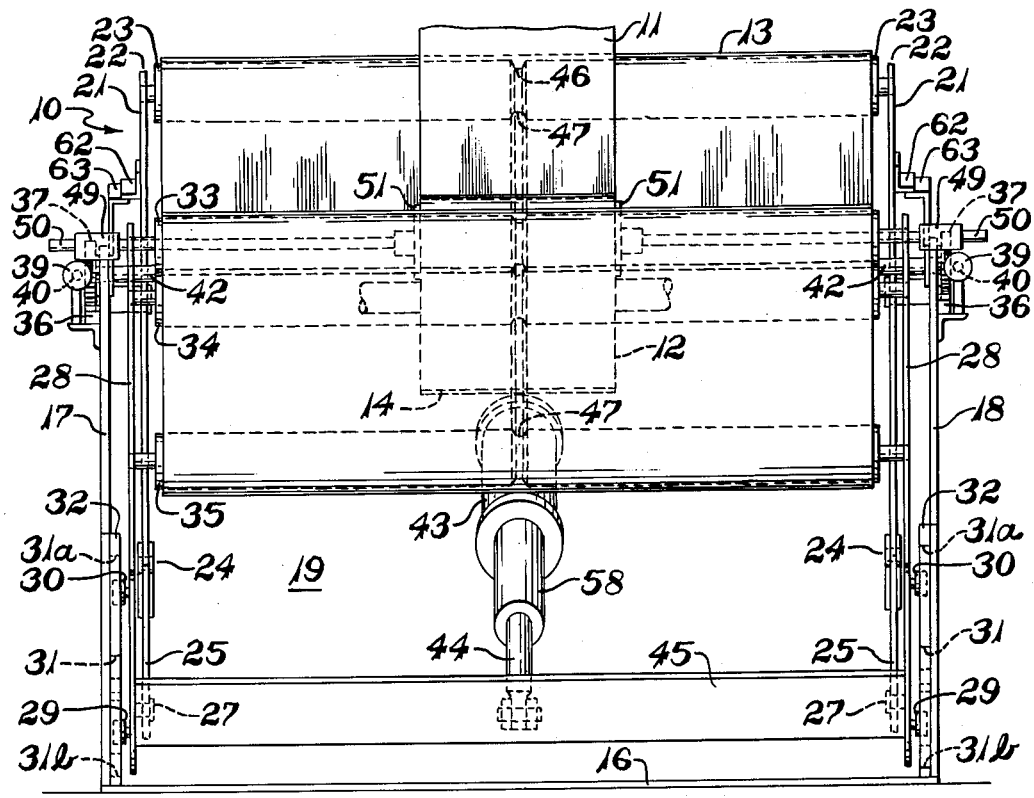
FIG. 2 is a front elevational view of the apparatus.

The presently preferred form of the apparatus embodying this invention is illustrated in the drawings as a machine 10 for applying cord reinforced elastomeric fabric 11 to a tire building drum 12 suitably mounted for rotation about a horizontal axis by means not shown. Briefly stated, the machine comprises an endless applicator belt 13 on which the cord fabric 11, commonly referred to as ply stock, is manually or otherwise aligned initially, after which the belt and fabric are brought into partial arcuate circumferential contact with the building drum 12, with rotation of the drum causing the belt 13 and the fabric 11 to advance. The tacky nature of the fabric 11 causes it to stick to the drum surface 14 and be wound about the drum in one or more successive layers as the belt 13 advances, with the belt performing a smoothing and stitching action upon the stock as it is wrapped about the drum. Preferably, the outer surface 15 of the belt 13 is treated to prevent sticking thereto by the fabric 11.

The frame of the belt type applicator 10 includes a base plate 16, vertical side supports 17 and 18 and a vertical back support 19. Rotatably mounted between and journaled in the side supports 17 and 18 is a horizontally extending belt idler roll 20. Pivotally mounted at each end of the roll 20 and adjacent to the inner surfaces of the vertical side supports 17 and 18, respectively, are triangular frame members 21. Mounted between one pair of corresponding corners 22 of the said frame members 21 is a belt idler roll 23. The other corresponding corners 24 of the triangular frame members 21 are pivotally connected to the upper ends of links 25. The lower end of each of these links is provided with a longitudinally extending slot 26 in which is received a pin 27 mounted on the lower portion of generally hook-shaped belt placement arms 28. There are two such arms, one on each side of the machine, and near the lower end of each of said arms are disposed a pair of rotatable cam track followers 29 and 30 which travel in cam grooves 31, 31a and 31b in cam track panels 32, which panels are mounted on the lower portions of the side supports 17 and 18. Adjacent the other ends of said belt placement arms 28, and rotatably mounted therebetween, are a pair of belt idler rolls 33 and 34. At a short distance from the idler rolls 33 and 34, another belt idler roll 35 is rotatably mounted between the placement arms 28, with the belt 13 passing sequentially about the aforesaid idler rolls 33, 34 and 35.

Horizontally mounted on the outer side of each of the side supports 17 and 18 are gear racks 36. Rotatably engaged with each of the gear racks 36 is a pinion gear 37 mounted on an end of a belt idler roll 38. Also mounted on the side supports 17 and 18 are fluid pressure cylinders 39, extending perpendicularly to the idler roll 38 with the ends of the piston rods 40 attached to bearings 41 on the journals 42 of idler roll 38. Pivotally mounted on the back support 19 is a double-acting, telescoping air cylinder 43, the piston rod 44 of which is pivotally connected to a horizontal box beam 45 joining the lower portions of the belt placement arms 28.

The belt 13 is provided with a continuous rib 46 on its underside to prevent lateral misalignment during its travel. This rib engages a peripheral groove 47 formed in the central portion of the outer surface of each of the idler rolls 20, 23, 33, 34, 35 and 38. Provision is also made for effecting lateral alignment of the stock 11 on the belt. For this purpose bearing brackets 48 are mounted on the upper portion of side supports 17 and 18. Mounted at the outer ends of said brackets are push rod bearings 49. Slidably mounted in each of the bearings 49 is a push rod 50. At the inner end of each push rod 50 is a ply stock alignment flange 51.

Figure 4:
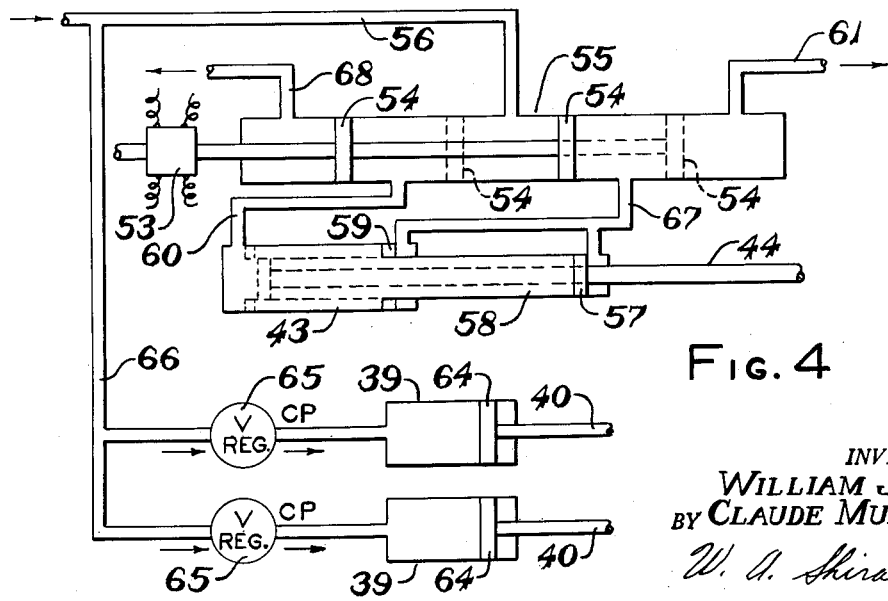
FIG. 4 is a schematic representation of the hydraulic actuating system for the apparatus.

In operation, the sheet of tire cord fabric 11 is taken from a conveyor, not shown, and draped upon the applicator belt 13, the latter being in its raised position as shown in phantom in FIG. 1. The operator then laterally locates the sheet of fabric 11 relative to the building drum 12 by means of the alignment flanges 51 which may be independently set at a predetermined distance from the lateral center of the building drum. He also aligns the fabric with the edges of the belt 13 by means of longitudinally extending parallel guide lines, not shown, on the belt. The operator then energizes one portion of the double solenoid 53 which causes the spaced pistons 54 of 4-way valve 55 to move from their dotted line positions of FIG. 4 to their full line position. This allows air from feed line 56 to flow to the left side of piston 57 of the telescoping air cylinder 43, forcing it to move from its dotted to full line position as seen in FIG. 4, also moving the telescoping inner cylinder section 58 to a position shown in full line in FIG. 4 and allowing air on the right side of the piston 57 and seal 59 of the inner cylinder 58 to be exhausted through line 67 and the valve 55 to exhaust line 61.

Movement of piston 57 advances piston rod 44, thus forcing the belt placement arms 28 to move from their position shown in phantom in FIG. 1 to the position shown in full lines in that figure. As piston rod 44 moves the arms 28, cam track followers 29 and 30 travel together in the straight portion 31 of the cam groove until follower 30 comes to the entrance to the upper arcuate portion 31a of the groove. At this time the follower 29 drops into the lower arcuate portion 31b of the cam groove and follower 30 enters the upper arcuate portion 31a. This imparts a small amount of rotary motion to the placement arms 28 so that, as the piston rod 44 progresses outward, the belt idler rolls 33 and 34 are stroked under and up about one side of the building drum 12 in combined lateral and rotary movement, thus bringing the belt and the fabric 11 thereon into partial arcuate circumferential engagement with the outer surface 14 of the building drum 12. The described movement of the placement arms 28 allows the links 25 to travel downwardly. This in turns lowers triangular frame members 21 and idler roll 23 attached thereto until stop plates 62 mounted on members 21 engage stop plates 63 mounted on the vertical side supports 17 and 18. Thus, the slope of the belt 13 from idler roll 23 to idler roll 20 is reduced, eliminating the possibility of the sheet of tire building fabric 11 slipping and becoming misaligned. Constant tension is maintained on the belt at all times by action of the idler roll 38 which is continuously urged against the belt as the result of fluid pressure applied against pistons 64 of cylinders 39 through pressure regulator valves 65 and feed line 66 which is connected to the main feed line 56. The alignment of idler roll 38 is controlled by the rack and pinion gears 36 and 37. With the belt 13 now engaged with the building drum the operator causes the drum to rotate which drives the belt, and advances the tire cord fabric 11 thereon to the drum 12 where it is wound about the drum in one or more layers depending upon the length of the fabric. The operator may allow the drum 12 to continue rotating after the fabric is completely applied to the drum to improve the adhesion of all portions of the fabric to the adjacent inner convolutions or plies, thus eliminating of reducing the necessity for manual stitching.

After the fabric 11 has been fully plied and stitched, the operator de-energizes the previously energized portion of double solenoid 53 and energizes the other portion thereof. This returns the pistons 54 of valve 55 to their original position, shown in dotted lines in FIG. 4, thereby directing air from line 56 through line 67 to retract piston 57 and telescoping cylinder section 58 to their original positions also shown in dotted line in FIG. 4. During retraction of piston rod 44 and cylinder section 58 air on the left side of piston 57 is exhausted through line 60 and valve 55 to exhaust line 68. Retraction of piston rod 44 pulls belt placement arms 28 down and away from the building drum and raises the triangular frame members 21 and idler roll 23 to their original raised positions, shown in phantom in FIG. 1, in readiness for receiving a new piece or block of tire cord fabric 11.

It will be appreciated that, although the invention has been described with reference to its embodiment in one specific apparatus, changes and modifications may be made in that embodiment without departing from the spirit and scope of the invention as defined in the appended claims.

Having thus described the invention, we claim:

1. An apparatus for applying ply stock to a rotatable tire building drum, comprising belt supporting means including movable portions, movement directing means on said apparatus, means mounting a first of said portions for confined movement along said movement directing means from a first position away from one side of said drum to a second position adjacent the periphery of the other side of said drum, an endless flexible belt supported by said belt supporting means for movement in the direction of its length and engageable with an arcuate portion of said periphery when said first of said portions is moved adjacent the periphery of said drum, and means to move said first of said portions to and from said second position.

2. An apparatus for applying ply stock to a rotatable tire building drum, comprising a frame; a belt supporting assembly including a first portion rockably mounted on said frame, and a second portion including a pair of spaced belt placement arms; means mounting said second portion on said frame for limited rocking and translational movement toward and away from said drum; a plurality of belt supporting rolls rotatably mounted on said assembly with at least one of said rolls mounted on said placement arms; an endless flexible belt supported by said rolls and engageable with an arcuate portion of said drum as said second portion is moved toward said drum; means to move said second portion toward and away from said drum; means responsive to predetermined movement of said second portion to rock said first portion; and means to maintain uniform tension on said belt as said second portion is moved toward and away from said drum.

3. An apparatus for applying ply stock to a tire building drum, comprising a frame, a belt supporting assembly including a first and second portion, means mounting said first portion on said frame for pivotal movement about an axis parallel to the axis of said drum, said second portion comprising a pair of belt placement arms with an arm disposed to either side of said frame in planes perpendicular to said axes, a plurality of belt supporting rolls rotatably mounted on said assembly with at least one of said rolls supported by said arms, an endless flexible belt trained about all of said rolls and movable in the direction of its length when engaged with an arcuate portion of said tire building drum, cooperating cam means mounting said placement arms on said frame for combined rocking and translational movement to carry one of said rolls and said belt supported thereby from a position away from one side of said drum to and from belt engaging contact with an arcuate portion of said drum opposite said position, means connecting said portions for movement of one portion in response to movement of the other portion, and means to effect movement of one of said portions.

4. Apparatus as defined in claim 3 further comprising a rotatable idler roll engaged with the underside of said belt, means mounting said roll on said frame for movement relative to the frame transversely of the axis of the roll, and controlled fluid pressure means urging said roll against said belt to maintain the belt under uniform tension as it is moved to and from engagement with the drum.

5. An apparatus for applying ply stock to a rotatable tire building drum, comprising belt supporting means including first and second portions, means slidably mounting said first portion for movement from a position spaced from one side of said drum to a position engaged with the other side thereof, means mounting said second portion for movement in response to movement of said first portion, an endless flexible belt supported by said belt supporting means for engagement with an arcuate portion of the periphery of said drum, means to move said first portion to said position engaged with said drum, and means to maintain uniform tension on said belt as said first portion is so moved.

6. An apparatus for applying ply stock to a rotatable tire building drum, the said apparatus comprising a frame positioned at one side of said drum, a first belt-supporting means pivoted on said frame for rocking movement about an axis parallel with and at the said one side of the axis of the drum, a second belt-supporting means including a portion movable from a location spaced from said drum at the said one side thereof to a location on the other side of and closely adjacent the periphery of the drum, an endless belt supported on said belt-supporting means for travel in the direction of its length in a path extending at right angles to the axis of said drum, means pivotally interconnecting said first and second belt-supporting means, cooperating cam means on said frame and said second belt-supporting means for guiding movement of the latter, and means connected to said second belt-supporting means to effect movement of the said portion of the latter to and from the aforementioned locations thereof.

7. An apparatus for applying ply stock to a rotatable tire building drum, the said apparatus comprising a frame positioned at one side of said drum, a pair of triangularly shaped members pivoted in spaced relationship on said frame for rocking movement about a common axis parallel with and at one side of the axis of said drum, a pair of belt-placement members, means pivotally interconnecting said belt-placement members to said triangularly shaped members, a plurality of belt-supporting rollers on said triangularly shaped and said belt-placement members, an endless belt trained about said rollers, cooperating cam means on said frame and belt-placement members so constructed and arranged that the latter are guided in movement to and from positions in which said belt is disposed in a generally triangular configuration at one side of and spaced from said drum or with a portion of the belt extending beneath and to the other side of the drum in pressure-exerting relationship to the adjacent periphery of the drum, and reciprocating motion-producing means connected to said belt-placement members.

References Cited in the file of this patent

UNITED STATES PATENTS

| 1,209,161 | Hoyt | Dec. 19, 1916 |
| 1,762,752 | Abbott | June 10, 1930 |
| 2,567,150 | Frazier | Sept. 4, 1951 |
| 2,588,207 | Cleland | Mar. 4, 1952 |

FOREIGN PATENTS

| 812,581 | Great Britain | Apr. 29, 1959 |
| 1,158,231 | France | Jan. 20, 1958 |